(12) United States Patent
Adkins et al.

(10) Patent No.: US 6,528,609 B1
(45) Date of Patent: Mar. 4, 2003

(54) ALLOPHANATES OF POLYMERIC MDI

(75) Inventors: Rick L. Adkins, New Martinsville, WV (US); William E. Miller, St. Clairsville, OH (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 10/017,060

(22) Filed: Dec. 13, 2001

(51) Int. Cl.⁷ ............................................. C08G 18/10
(52) U.S. Cl. ...................... 528/59; 528/73; 252/182.22; 560/27
(58) Field of Search ................ 560/27; 252/182.22; 528/59, 73

(56) References Cited

U.S. PATENT DOCUMENTS

| | | | |
|---|---|---|---|
| 3,793,362 A | 2/1974 | Kolakowski et al. | 260/453 SP |
| 3,925,437 A | 12/1975 | Rowton | 260/453 SP |
| 5,258,417 A | 11/1993 | Narayan | 521/160 |
| 5,342,881 A | 8/1994 | Müller et al. | 524/700 |
| 5,726,240 A | 3/1998 | Rosthauser et al. | 524/590 |
| 5,783,652 A | 7/1998 | Rosthauser et al. | 528/48 |
| 5,902,840 A | 5/1999 | Singh et al. | 523/142 |

FOREIGN PATENT DOCUMENTS

| | | | |
|---|---|---|---|
| CA | 915846 | | 11/1972 |
| EP | 1122271 | * | 9/2001 |

* cited by examiner

*Primary Examiner*—Rachel Gorr
(74) *Attorney, Agent, or Firm*—Joseph C. Gil; N. Denise Brown

(57) ABSTRACT

This invention relates to a process for forming an allophanate-modified polymethylene poly(phenylisocyanate) comprising the steps of reacting a small amount of epoxide, along with alcohol, to polymethylene poly(phenylisocyanate) (PMDI) to form an intermediate, which is converted to allophanate upon addition of a metal divalent catalyst. This invention also relates to a process for forming an allophanate-modified PMDI comprising the steps of adding a small amount of epoxide, to PMDI to form an intermediate, which is converted to allophanate upon addition of an alcohol and a metal divalent catalyst. Both processes according to the invention of preparing allophanate-modified PMDI use mild conditions and low catalyst levels to yield viscosity stable products.

24 Claims, No Drawings

ALLOPHANATES OF POLYMERIC MDI

BACKGROUND OF THE INVENTION

This invention relates to a process for forming an allophanate-modified polymethylene poly(phenylisocyanate) comprising the steps of reacting a small amount of epoxide, along with alcohol, to polymethylene poly(phenylisocyanate) (PMDI) to form an intermediate, which is converted to allophanate upon addition of a metal divalent catalyst. This invention also relates to a process for forming an allophanate-modified PMDI comprising the steps of adding a small amount of epoxide, to PMDI to form an intermediate, which is converted to allophanate upon addition of an alcohol and a metal divalent catalyst. The present invention also relates to these allophanate-modified polymethylene poly(phenyl isocyanates).

Allophanate-modified methylene bis(phenyisocyanate) (MDI) have seen increased use in many applications ranging from polyurethane foams to coatings. Polymeric MDI, however, is problematic toward allophanate formation due to its high acidity. The high acidity neutralizes the allophanate catalyst and thus inhibits allophanate formation. Extremely high catalyst levels, high reaction temperatures, and long reaction times are required to form allophanates using PMDI. It was therefore, an object of the present invention to develop a process for preparing PMDI-based allophanates using mild conditions and low catalyst levels.

The process for the preparation of allophanate-modified polymeric aromatic isocyanates is known. For example, U.S. Pat. No. 5,902,840 discloses a method for the preparation of allophanate modified PMDI. The disclosed process comprises the step of reacting PMDI with a monofunctional aliphatic alcohol to form an intermediate, and reacting this intermediate at elevated temperature in the presence of a divalent metal catalyst. The modified polyisocyanates, along with a phenolic resole resin are added to a foundry aggregate to form a foundry mix which is shaped and cured with a gaseous amine curing catalyst by the cold-box process.

U.S. Pat. No. 5,342,881 discloses a stabilized organic poly-isocyanate composition comprising an organic polyisocyanate, one or more compounds having at least one epoxide group of a specific formula, and a stabilizing silylating agent and/or alkylating agent. The polyisocyanate/epoxide mixture is optionally heated before the stabilizing agents are added. These polyisocyanates are useful in the production of polyisocyanate addition products. The silylating agent or alkylating agent is necessary to form a stable polyisocyanate component.

U.S. Pat. No. 5,783,652 relates to mixtures of urethane prepolymers of allophanate-modified diphenylmethane diisocyanates with epoxides. The addition of the epoxide increases the reactivity of these prepolymers. Polyurethanes are formed from these mixtures based on prepolymers of diphenylmethane diisocyanates wherein less catalyst is necessary due to the increased reactivity of the prepolymer.

U.S. Pat. No. 5,258,417 describes storage stable blends of polymethylene polyphenylpolyisocyanates having viscosities from 15 to 37 cps that are prepared by adding diphenylmethane diisocyanates to the polymeric MDI in amounts such that the two-ring isomer content does not exceed 80 percent by weight of the blend. These blends within the limitations given are stable for up to six months at 25° C. The ring distribution of the blend comprises: 1) from 60 percent to about 75 percent by weight 4,4'-diphenylmethane diisocyanate, 2) from 4 percent to about percent by weight 2,4-diphenylmethane diisocyanate, 3) less than 1 percent by weight 2,2'-diphenylmethane diisocyanate, 4) from 8 percent to about 15 percent by weight of a 3-ring polymethylene polyphenylpolyisocyanate, and, 5) from 5 percent to about 15 percent by weight of a 4-ring and higher oligomeric polymethylene polyphenylpolyisocyanate.

Several patents disclose that the acidity of PMDI can be reduced, and/or the reactivity of PMDI can be improved or increased by the addition of epoxides to the reaction mixture. These patents include for example, U.S. Pat. Nos. 3,793,362; 3,925,437; 5,726,240; and CA 915,846.

U.S. Pat. No. 5,726,240 discloses that the process of producing polyurethanes by reacting a polyisocyanate component with an isocyanate-reactive component typically occurs in the presence of one or more catalysts. Suitable catalysts include, for example, organometallic catalysts and tertiary amine compounds. The quantity of catalyst necessary is dependent on the acidity of the particular polyisocyanate component used in this process. As the acidity of the polyisocyanate increases, the reactivity of the polyisocyanate decreases. In other words, it takes longer for the reaction to occur unless additional catalyst is added. In order for the reaction to proceed within a specific time period consistently, it is usually necessary to increase or decrease the quantity of catalyst used to achieve constant reactivity profiles using blends of polyisocyanates with various acidity levels.

Additionally, U.S. Pat. No. 5,726,240 discloses that with the use of mixtures of polymethylene polyisocyanate blends with epoxides in the process of producing polyurethanes, it is possible to reduce the quantity of catalyst. The reactivity profiles of catalyzed formulations containing these isocyanate blends are significantly more stable, regardless of the acidity level of the polyisocyanate.

It is surprising that the allophanate modified PMDI prepared according to the present invention is stable as measured by viscosity over time. This is surprising because this stability is in direct conflict with prior disclosures. For instance, U.S. Pat. No. 5,342,881 deals with the stabilization of PMDI/epoxide mixtures by the addition of silylated acids and/or alkylated acids. Table 1 of this reference shows that, unless a stabilizer is added to the system, large increases in viscosity are seen. Furthermore, Column 7, lines 34–45 imply that any modification of PMDI, either urethane or allophanate based, must also be stabilized when epoxides are added to them.

This instability is further illustrated in U.S. Pat. No. 5,783,652, which describes the process of adding epoxides to urethane prepolymers of an allophanate-modified diphenylmethane diisocyanate. Tables A & B of '652 illustrate that the addition of epoxides to MDI allophanates gives unstable products. In column 2, lines 16–18, U.S. Pat. No. 5,783,652 specifically states that "the treated allophanate-modified MDI is not stable relative to the NCO content and viscosity at normal storage temperatures of 25 to 50° C."

The present invention provides storage stable allophanate modified PMDI products at normal storage temperatures. For example, an allophanate modified PMDI was prepared from a PMDI component, isobutanol, epoxide, allophanate catalyst. After 14 days of storage at 25° C., a decrease in viscosity was observed in this sample. According to U.S. Pat. No. 5,783,652, a viscosity increase should have occurred at this temperature indicating that the product was unstable. This decrease in viscosity is contrary to what is disclosed or suggested by U.S. Pat. No. 5,783,652.

Table 1 from U.S. Pat. No. 5,342,881 illustrates that a decrease in % NCO is accompanied by an increase in viscosity. Furthermore, the larger the % NCO decrease, the greater the viscosity increase. The combination of U.S. Pat. Nos. 5,342,881 and 5,783,652 would lead one skilled in the art to conclude that 1) addition of epoxides to allophanate modified isocyanates results in unstable products that increase in viscosity, and 2) addition of some type of stabilizer (as in U.S. Pat. Nos. 5,342,881 and 5,783,652) is necessary to prevent this instability.

The present invention thus provides an improved process over U.S. Pat. No. 5,902,840 for preparing allophanate modified PMDI products. PMDI plus only epoxides yield unstable products as disclosed by U.S. Pat. No. 5,342,881. The formation of urethane does not stabilize PMDI/epoxide mixture. U.S. Pat. No. 5,726,240 shows that epoxides destabilize allophanate modified monomeric MDI. It is evident from the examples of U.S. Pat. No. 5,726,240 that the viscosity of the allophanate modified MDI increases significantly over a time period of about 50 minutes to 100,000 mPa.s. In the present invention, in-situ formation of allophanates in a PMDI/epoxide mixture gives a more stable product. This is unexpected.

SUMMARY OF THE INVENTION

This invention relates to a process for forming allophanate-modified PMDI comprising the steps of reacting a small amount of epoxide, along with alcohol, to polymethylene poly(phenylisocyanate) (PMDI) to form an intermediate, which is converted to allophanate upon addition of a metal divalent catalyst. This invention also relates to a process for forming an allophanate-modified polymethylene poly(phenylisocyanate) comprising the steps of adding a small amount of epoxide, to polymethylene poly (phenylisocyanate) (PMDI) to form an intermediate, which is converted to allophanate upon addition of an alcohol and a metal divalent catalyst. The present process for preparing PMDI-based allophanates uses mild conditions and low catalyst levels to yield viscosity stable allophanate-modified PMDI. The present invention also relates to novel allophanate-modified polymethylene poly(phenyl isocyanates).

DETAILED DESCRIPTION OF THE INVENTION

The invention relates to novel processes for the production of storage stable allophanate modified polymeric aromatic isocyanates containing reactive isocyanate groups and allophanate linkages. This process comprises reacting an intermediate comprising a polymeric aromatic isocyanate, an epoxide and an alcohol with an allophanate catalyst at an elevated temperature to yield polymers containing reactive isocyanate groups and allophanate linkages. In another embodiment, this process comprises reacting an intermediate of PMDI and epoxide with allophanate catalyst and alcohol at an elevated temperature.

Another aspect of this invention is the allophanate-modified polymethylene poly(phenyl isocyanates) produced by these processes. These allophanate-modified polymethylene poly(phenyl isocyanates) preferably have at least about 50% of the urethane groups converted to allophanate groups, more preferably at least about 60% of the urethane groups converted to allophanate groups. These conversion amounts are based on the theoretical % NCO that would be present in the resulting urethane if no epoxide was used, the theoretical allophanate % NCO (assuming 100% conversion of NCO groups to allophanate groups), and the actual conversion to allophanate (in % NCO). In addition, it is preferred that these allophanate-modified polymethylene poly(phenyl isocyanates) are relatively stable in terms of viscosity vs. time stored. More specifically, the viscosity of these allophanate-modified polymethylene poly(phenyl isocyanates) preferably does not increase by more than 50% over 3 months (or longer), more preferably by more than 40% over 3 months (or longer), and most preferably by more than 35% over 3 months (or longer).

Suitable isocyanates for the presently claimed invention are polymethylene poly(phenylisocyanate) blends having a functionality of from about 2.1 to about 3.5, preferably 2.3 to 3.0 and most preferably of 2.6 to 2.8, and an NCO group content of about 20% to about 33%, preferably about 30.0 to about 32.5%, and a monomer content of from about 26% to about 95% by weight, preferably from about 40% to about 70%. The polyisocyanate comprises (i) from 0 to 5% by weight of the 2,2'-isomer of MDI, preferably from 0 to 2.5% by weight; (ii) from 1 to 25% by weight of the 2,4'-isomer of MDI, preferably from 2 to 20% by weight; (iii) from 25 to 65% by weight of the 4,4'-isomer of MDI, preferably from 30 to 45% by weight; and (iv) from 5 to 74% by weight of higher molecular weight homologues of the MDI series, preferably from about 30% to about 60% by weight, wherein the %'s by weight of (i)–(iv) total 100% by weight of the polyisocyanate component.

Polymeric MDI as used herein, refers to the three-ring and/or higher ring products derived by the phosgenation of aniline-formaldehyde condensation products. Preferred isocyanates comprise from about 30 to about 60% by weight of polymeric MDI.

Any chemical compound which contains the epoxide (oxirane) functionality is suitable in the preparation of the mixtures of the present invention. The term "epoxide" or "epoxy" as used herein refers to any organic compound or resin comprising at least one group comprising a three membered oxirane ring. Preferably two or more oxirane groups are present in the epoxide compound or resin in order to obtain the polyisocyanate compositions with consistent reactivity profiles of the instant invention. The epoxide equivalent weight (EEW) range of suitable epoxides is from about 44 to 400, preferably 100 to 350 and most preferably 150 to 300. Both aromatic and aliphatic polyepoxides may be used, and are well known.

It is somewhat less preferred that the epoxy comprises an aromatic polyepoxide due to the tendency of them to cause yellowing as well as their reduced efficacy. Examples of such aromatic polyepoxides include but are not limited to those selected from the group consisting of the polyglycidyl ethers of polyhydric phenols; glycidyl esters of aromatic carboxylic acids; N-glycidylaminoaromatics such as N-glycidylaminobenzene, N,N,N',N'-tetraglycidyl-4,4'-bis-aminophenyl methane, and diglycidylaminobenzene; glycidylamino-glycidyloxyaromatics such as glycidyl-aminoglycidyloxybenzene; and mixtures thereof.

The aromatic polyepoxide resins, comprised of the polyglycidylethers of polyhydric phenols including bis(phenol A), are also less preferred because they contain hydroxyl groups and thus, react with the polyisocyanate mixtures. Thus, this reduces the isocyanate content. Also, less preferred are aliphatic epoxides containing hydroxyl groups, e.g., glycidol, for the same reason. The preferred epoxides for use according to the invention are the aliphatic epoxides that do not contain hydroxyl groups.

Suitable for use are $C_2$–$C_{10}$ aliphatic epoxides such as, for example, ethylene oxide, propylene oxide, 1,2-butene oxide, 2,3-butene oxide (cis and/or trans), isobutylene oxide, 1,2-pentene oxide, 2,3-pentene oxide, cyclopentene oxide, 1,2-hexene oxide, cyclohexene oxide, and the like and mixtures thereof.

Examples of useful aliphatic polyepoxides include but are not limited to those selected from the group consisting of vinyl cyclohexene dioxide; butadiene dioxide; and those containing ether linkages such as triglycidyl isocyanurate, triglycidyl pentaerythritol, tetraglycidyl pentaerythritol, diglycidylethers of cyclohexane dimethanol and the diglycidylethers of other diols known to those skilled in the art, 1,4-bis(2,3-epoxypropoxy)benzene; 1,3-bis(2,3-epoxypropoxy)benzene; 4,4'-bis(2,3-epoxypropoxy)

diphenyl ether; 1,8-bis(2,3-epoxypropoxy)octane; 1,4-bis(2,3-epoxypropoxy)cyclohexane; 4,4'-(2-hydroxy-3,4-epoxybutoxy)-diphenyl dimethyl methane; 1,3-bis(4,5-epoxypentoxy)-5-chlorobenzene; 1,4-bis(3,4-epoxybutoxy)-2-chlorocyclohexane; diglycidyl thioether; diglycidyl ether; 1,2,5,6-diepoxyhexane-3; 1,2,5,6-diepoxyhexane; those containing ester groups such as ERL 4221, a product of Union Carbide Corporation, illustrated in U.S. Pat. No. 4,814,103, the disclosure of which is herein incorporated by reference, and mixtures thereof.

Other useful epoxides are listed in, for example, U.S. Pat. No. 3,298,998, the disclosure of which is herein incorporated by reference. These compounds include but are not limited to those selected from the group consisting of bis[p-(2,3-epoxypropoxy)phenyl]cyclohexane; 2,2-bis[p-(2,3-epoxypropoxy)phenyl]norcamphane; 5,5-bis[(2,3-epoxypro-poxy)phenyl]hexahydro-4,6-methanoindane; 2,2-bis[4-(2,3-epoxypropoxy)-3-methylphenyl]hexahydro-4,7-methanoindane; and 2-bis[p-2,3-epoxypropoxy) phenyl]-methylene-3methylnorcamphane; and mixtures thereof. Other usable epoxides are found in, for example, Handbook of Epoxy Resin, Lee and Neville, McGraw-Hill, N.Y. (1967) and U.S. Pat. No. 3,018,262, both of which are herein incorporated by reference.

Also, suitable epoxides for use in the present invention include the epoxidized dimer and trimer fatty acids, which are formed by epoxidizing the products of the polymerization of $C_{18}$ unsaturated fatty acids such as oleic acid, linoleic acid, linolenic acid, elaidic acid and the like. The use of a dimer or trimer fatty acid entity furnishes a higher molecular weight epoxide that is less likely to volatilize from the finished articles that the polyisocyanate compositions of the present invention are used to produce. The dimer fatty acid may have an acyclic, monocyclic, or bicyclic structure or comprise a mixture of compounds having different such structures.

Epoxidized mono-, di- and triglycerides prepared by epoxidation of the known unsaturated or partially unsaturated glycerides are preferred. The epoxidized glycerides may be prepared from any of the known fatty acid triglycerides available from natural or synthetic sources. The fatty acid group, which is connected to glycerol by an ester bond is usually a $C_6$–$C_{24}$ monocarboxylic acid (linear or branched; saturated, monounsaturated, or polyunsaturated). Such fatty acids and their equivalents are readily available at low cost from natural sources such as edible triglycerides. Specific illustrative fatty acids suitable for use include, but are not limited to, eicosanoic (arachidic) acid, heneicosanoic acid, docosanoic (behenic) acid, elaidic acid, tricosanoic acid, tetracosanoic (lignoceric) acid, caprylic acid, pelargonic acid, capric acid, caproic acid, lauric acid, palmitic acid, stearic acid, oleic acid, cetoleic acid, myristic acid, palmitoleic acid, gadoleic acid, erucic acid, rincinoleic acid, linoleic acid, linolenic acid, myristoleic acid, eleostearic acid, arachidonic acid, or mixtures or hydrogenated derivatives of these acids. The fatty acids may be derived synthetically or from natural sources such as triglyceride lipids. Mixtures of fatty acid entities, such as the mixtures of fatty acids typically obtained by hydrolysis (splitting) of a triglyceride are also suitable. These fatty acid triglycerides include, but are not limited to, fats and oils such as tallow, soybean oil, cottonseed oil, coconut oil, palm kernel oil, corn oil, fish oil, lard, butterfat, olive oil, palm oil, peanut oil, safflower seed oil, cocoa butter, sesame seed oil, rapeseed oil, sunflower seed oil, as well as fully or partially hydrogenated derivatives and mixtures of these triglycerides. Epoxidized linseed oil is particularly preferred. At least one epoxide is always present with the isocyanate component to form the intermediate.

Suitable alcohols which can be used to form allophanate modified polymeric aromatic isocyanates can be represented by the following structural formula, ROH, where R is a linear or branched aliphatic group having 2 to 50 carbon atoms, preferably from 6 to 30 carbon atoms. R can include, along its chain, carbon-carbon double or triple bonds, an aromatic ring, or even other functional groups as long as they are not reactive with the isocyanate. The hydrogen atoms in R can in addition be partially or totally replaced with fluorine atoms.

Representative examples of such alcohols include mono alcohols such as n-hexyl alcohol, n-heptyl alcohol, n-octyl alcohol, n-nonyl alcohol, n-decyl alcohol, lauryl alcohol, myristyl alcohol, cetyl alcohol, stearyl alcohol, arachidyl alcohol, behenyl alcohol, isohexyl alcohol, 2-ethyl hexanol, 2-ethyl isohexanol, iso octyl alcohol, phenethyl alcohol, isononyl alcohol, isodecyl alcohol, isotridecyl alcohol, isocetyl alcohol, isostearyl alcohol, oleyl alcohol, and linoleyl alcohol. Perfluorinated alcohols such as 1H, 1H, 5H-octafluoro-1-pentanol, 1H, 1H-heptafluoro-1-butanol, 1H, 1H-perfluoro-1-octanol, 1H, 1H, 2H, 2H-dodecafluoro-1-heptanol, N-ethyl-N-2-hydroxyethylperfluorooctane sulfonamide, and the like are also suitable. Mixtures of these alcohols can also be used. Preferred alcohols include n-butanol, isobutanol and pentanol.

The amount of alcohol used to form the modified polyisocyanate is from 0.005 to 0.5 equivalents, per equivalent of polyisocyanate, preferably about 0.005 to 0.25 equivalents, per equivalent of polyisocyanate. The alcohol content can vary depending upon the desired final % NCO and properties. The alcohol and the PMDI in the presence of an appropriate allophanate catalyst form an allophanate. The alcohol as herein described can be present in the intermediate or can be added to the intermediate along with the catalyst.

The catalyst employed according to the invention includes any suitable catalyst capable of forming allophanate linkages in polyisocyanates. The catalyst is added after the intermediate is formed in either embodiment of the invention. Suitable divalent metal catalysts include zinc acetylacetonate, zinc 2-ethylhexanoate, stannous octoate, colbalt 2-ethylhexanoate, colbalt naphthenate, and lead linoresinate. The preferred catalyst is zinc octoate. A catalyst stopper, such as acidic materials, e.g., anhyrous hydrochloric acid, sulfuric acid, bis(2-ethylhexyl)-hydrogen phosphate, benzoyl chloride, Lewis acids and the like in the ratio of two equivalents of the acid to each mole of the zinc octoate can be employed. Typically the reactions are conducted without solvents, but solvents which are generally inert to the isocyanate, for example toluene, tetrahydrofuran or halogenated aromatic solvents can be employed. The catalyst is typically present in amounts of 10 to 3000 ppm, preferably 50 to 300 ppm, based on the total weight of polyisocyanate in the reaction.

In one embodiment of the present invention, the intermediate is prepared by mixing (a) polyisocyanate and (b) 0.008 to 0.35 equivalent epoxide per equivalent polyisocyanate, of one or more epoxides having an epoxide equivalent weight of 44 to 400. The intermediate is then reacted with at least one allophanate catalyst and at least one alcohol to form the allophanate modified PMDI of the present invention. The allophanate catalyst component can be added to the intermediate before, after, or simultaneously with at least one alcohol. The allophanate catalyst component is present in amounts of about 0.001% to about 0.3% by weight, based on the total weight of polyisocyanate. The alcohol component is present in amounts of about 0.005 to about 0.5 equivalent per equivalent polyisocyanate.

In another embodiment of the present invention, the intermediate is prepared by mixing (a) polyisocyanate and (b) 0.008 to 0.35 equivalent epoxide per equivalent polyisocyanate, of one or more epoxides having an epoxide equivalent weight of 44 to 400; and (c) 0.005 to 0.5 equivalent, per equivalent polyisocyanate, of at least one alcohol. The epoxide component can be added to form the intermediate before, after, or simultaneously with at least one alcohol. The allophanate catalyst component is present in amounts of about 0.001% to about 0.3% by weight, based on the total weight of polyisocyanate.

The reaction according to the invention is carried out a temperature within the range of 60° C. to 120° C. The temperature can be increased before or after the catalyst is added and the temperature can be increased after the addition of the alcohol. The progress of the reaction according to the invention can be followed by determining the isocyanate content of the reaction mixture and Fourier Transform Infrared Spectroscopy. The $C_{13}$ NMR spectra of the modified polymeric isocyanate shows a polymer having unreacted isocyanate groups and allophanate linkages, and can be used to determine the percentage of unreacted isocyanate allophanate linkages in the modified polymeric isocyanate, as well as the purity of the modified polymeric isocyanate.

In the two embodiments, the intermediate is formed from either the polyisocyanate, epoxide, and alcohol or from polyisocyanate and epoxide. Either intermediate should be stirred at 25° C to 60° C. To either intermediate, the catalyst or the catalyst and/or alcohol should be added 5 to 15 minutes after the addition of the epoxide.

An allophanate-modified PMDI is "storage stable" according to the present invention if the sample has been stored at temperatures of about 20 to 50° C. for a period of at least 3 months and exhibits a viscosity increase of about 30% or less over the length of the storage period.

In addition to exhibiting storage stability, allophanate-modified PMDI formed by the present invention exhibits an actual % NCO content that is within +/−1% of the theoretical value of % NCO of the allophanate modified PMDI. The theoretical value of the % NCO in the resulting product can be calculated by methods known in the art. Because the actual % NCO content is within +/−1% of the theoretical value, a high conversion of the intermediate to allophanate is achieved without the by-products via side reactions of the NCO groups. If the actual % NCO is less than the theoretical value by more than 1 percent, this is an indication that by-products are being formed.

Suitable isocyanate-reactive components include those known in the field of polyurethane chemistry such as, for example, relatively high molecular weight (i.e., from about 500 to about 5000) polyether polyols, polyester polyols, polythioethers, polyacetals, amine-terminated poly-ethers, imines, polycarbonates, etc.; and relatively low molecular weight (i.e., 30 to 400) components which may contain hydroxyl and/or amine groups and/or other groups capable of reacting with an NCO group, including water. Low molecular weight components may be crosslinking agents, chain extenders, and/or chain terminators known to those skilled in the art of polyurethane chemistry.

It is, of course, also possible that additives may be used in the process of producing the polyurethane. Suitable additives include, for example, surface-active additives such as emulsifiers and foam stabilizers, blowing agents, cell regulators, flame retarding agents, plasticizers, antioxidants, UV stabilizers, adhesion promoters, dyes, fillers and reinforcing agents such as glass in the form of fibers or flakes or carbon fibers, internal mold release agents, pigments, etc. Usually when pigments are added, they are dispersed in a hydroxyl group containing compound (such as, for example, a polyether, a polyester, or a chain extender). Any of the other known additives typically used in the field of polyurethane/urea chemistry may also be used.

The polyurethanes produced from the mixtures of this invention are suitable for use in areas such as, for example, various types of foams including flexible, semi-rigid, rigid and integral skin foams including reaction injection molding compounds, resin transfer molding compounds, elastomers, adhesives, binders, paints and coatings, etc.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages and parts are percentages and parts by weight, respectively.

EXAMPLES

The following components were used in the working examples:

Isocyanate A: A 130 equivalent weight polymeric isocyanate mixture having an NCO group content of about 32.3%, an average functionality of about 2.4, and containing about 44% monomeric 4,4'-MDI, about 20% monomeric 2,4'- and 2,2'-MDI isomers, and about 36% higher molecular weight homologues of the MDI series. The viscosity of the mixture was about 40 mPa.s at room temperature and the acidity was 132 ppm.

Isocyanate B: A 129 equivalent weight polymeric isocyanate mixture having an NCO group content of about 32.5%, an average functionality of about 2.2, and containing about 52.4% monomeric 4,4'-MDI, about 21.8% monomeric 2,4'-MDI and about 1.8% monomeric 2,2'-MDI isomers, and about 24% higher molecular weight homologues of the MDI series. The viscosity of the mixture was about 26 mPa.s at room temperature and the acidity was 129 ppm.

Isocyanate C: A 135 equivalent weight polymeric isocyanate mixture having an NCO group content of about 33.6%, an average functionality of about 2.8, and containing about 41% monomeric 4,4'-MDI, about 4% monomeric 2,4'-MDI isomers, and about 55% higher molecular weight homologues of the MDI series. The viscosity of the mixture was about 196 mPa.s at room temperature and the acidity was 173 ppm.

Catalyst A: zinc octoate
Catalyst B: stannous octoate
Alcohol A: oleyl alcohol
Alcohol B: isobutanol
Epoxide A: epoxidized linseed oil
Epoxide B: butyl glycidyl ether
Epoxide C: epichlorohydrin
Epoxide D: 1,2-epoxyoctane
Epoxide E: 1,2-epoxy-3-phenoxy propane
Epoxide F: glycidol

Process of the Invention

The epoxide was added to the isocyanate at 25° C. in a 250 mL 3-neck flask equipped with a mechanical stirrer and under a nitrogen atmosphere. After stirring for 10 minutes, the alcohol was added and the mixture heated at 60° C. for 1 hour. The catalyst was then added and the mixture heated to "Temperature," the reaction temperature, for "Time to %NCO" hours. These values are found in Tables 1a, 1b and 2. The resulting dark liquid was cooled to 60° C. and benzoyl chloride (0.04–0.32 g) was added to decompose the catalyst. The allophanate modified polymeric MDI was then analyzed for viscosity and % NCO content.

TABLE 1

Process Results

| | Example | | | | | | | |
|---|---|---|---|---|---|---|---|---|
| | 1 | 2 | 3 | 4 | 5 | 6 | 7 | 8 |
| Isocyanate A (g) | 200 | 200 | 200 | 200 | 200 | — | — | — |
| Isocyanate B (g) | — | — | — | 13 | — | 200 | 200 | — |
| Isocyanate C (g) | — | — | — | — | — | — | — | 200 |
| Epoxide A (g) | — | — | 0.8 | 0.8 | 0.5 | 0.5 | 0.8 | 0.66 |
| Alcohol A (g) | 16 | 16 | 16 | 16 | — | — | — | — |
| Alcohol B (g) | — | — | — | — | 8 | 8 | 8 | 8 |
| Catalyst A (ppm) | 800 | 800 | 800 | 200 | — | — | — | — |
| Catalyst B (ppm) | — | — | — | — | 200 | 200 | 200 | 200 |
| Temperature (° C.) | 120 | 90 | 90 | 90 | 90 | 90 | 90 | 90 |
| Allophanate % NCO | 27.9 | 28.2 | 26.6 | 26.7 | 26.2 | 26.4 | 26.3 | 26.3 |
| Theory % NCO | 27 | 27 | 26.8 | 26.8 | 26.3 | 26.5 | 26.5 | 26.3 |
| Time to % NCO (hr) | 4 | 4 | 3.5 | 3 | 2 | 2.5 | 2 | 3 |

| | Example | | | | | | | |
|---|---|---|---|---|---|---|---|---|
| | 9 | 10 | 11 | 12 | 13 | 14 | 15 | 16 |
| Isocyanate C (g) | 200 | 200 | 200 | 200 | 200 | 200 | 200 | 200 |
| Epoxide A | 0.5 | 0.5 | 0.5 | — | — | — | — | — |
| Epoxide B | — | — | — | 0.48 | — | — | — | — |
| Epoxide C | — | — | — | — | 0.34 | — | — | — |
| Epoxide D | — | — | — | — | — | 0.47 | — | — |
| Epoxide E | — | — | — | — | — | — | 0.56 | — |
| Epoxide F | — | — | — | — | — | — | — | 0.27 |
| Alcohol B (g) | 8 | 8 | 3 | 8 | 8 | 8 | 8 | 8 |
| Catalyst B (ppm) | 200 | 200 | 200 | 200 | 200 | 200 | 200 | 200 |
| Temperature (° C.) | 90 | 120 | 90 | 90 | 90 | 90 | 90 | 90 |
| Allophanate % NCO | 26.4 | 26.4 | 29.7 | 26.2 | 26.4 | 26 | 26 | 25.8 |
| Theory % NCO | 26.3 | 26.3 | 29.8 | 26.3 | 26.3 | 26.3 | 26.3 | 26.1 |
| Time to % NCO (hr) | 4 | 2 | 3.5 | 2 | 3 | 2 | 2 | 2 |

Examples 1, 2, and 5–16 were produced by the above process. In Examples 3 and 4, the alcohol was added prior to the epoxide. In Examples 1–16, the catalyst was added after the alcohol and epoxide were added to the polyisocyanate. The catalyst stopper employed in Examples 1–16 was 2 times the amount of catalyst weight. In Table 1, the process results can been seen. The row labeled "Allophanate %NCO" shows the actual % NCO in the resulting allophanate-modified polymeric MDI. The "Theory %NCO" is the theoretical % NCO that would be present in the resulting allophanate-modified polymeric MDI if no side reactions had occurred. The "Time to %NCO" row represents the time at which the "Allophanate %NCO" readings were taken.

Table 1 illustrates the polyisocyanate products of the present invention using different isocyanates, alcohols and epoxides. Example 1 of the present invention is comparable to Example 1 of U.S. Pat. No. 5,902,840. The actual allophanate % NCO (27.9%) in Example 1 of the present application was 0.9 units higher than the theoretical value of % NCO (27%) in the resulting allophanate-modified polymeric MDI, whereas the actual % NCO (23.6%) in Example 1 of U.S. Pat. No. 5,902,840 was 3.5 units below the theoretical value of % NCO (27%). Example 2 is a repeat of Example 1 of the present invention at 90° C. instead of at 120° C. The actual allophanate % NCO in Example 2 of the present application was 1.2 units above theoretical value of % NCO (27%). Example 10, prepared by the process of the present invention, is comparable to Example 9 of the present application and somewhat to Example 1 of U.S. Pat. No. 5,902,840. Example 9 used 90° C. In Example 10 which used 120° C., the theoretical value of % NCO was reached in half the time required by Example 9. No by-products were produced in Example 10.

TABLE 2

Process Results

| | Example | | | | |
|---|---|---|---|---|---|
| | 17 | 18 | 19 | 20 | 21 |
| Isocyanate C (g) | 100 | 200 | 200 | 200 | 200 |
| Epoxide A (g) | — | — | 1.2 | 1.2 | 1.2 |
| Alcohol A (g) | 8 | 16 | 16 | 16 | — |
| Alcohol B (g) | — | — | — | — | — |
| Catalyst A (ppm) | 900 | 900 | 900 | 200 | 200 |
| Temperature (° C.) | 120 | 120 | 120 | 90 | 90 |
| Theory % NCO-urethane | 28.2 | 27.8 | 27.5 | 27.4 | 30.8 |
| Allophanate % NCO | 24.3 | 27.3 | 26.3 | 26.5 | 30.6 |
| Theory Allophanate % NCO | 27.1 | 26.5 | 26.3 | 26.3 | 30.6 |
| Time to % NCO (hr) | 4 | 6 | <0.5 | <2 | <1 |
| Viscosity (mPa · s) | 489 | 850 | 2050 | 1800 | 410 |

In Table 2, the process results are set forth. The row labeled "Theory %NCO-urethane" represents the theoretical % NCO that would be present in the resulting urethane if an epoxide was not used. The viscosity readings were taken one day after the reaction and represent the stability storage baseline.

Examples 19 and 20 were produced using a process similar to that used in Examples 3 and 4, i.e. the alcohol was added prior to the epoxide. Examples 17–18 and 21 are not representative of the present invention.

Example 17 in Table 2 is Example 3 of U.S. Pat. No. 5,902,840. Example 18 of Table 2 represents a similar polymeric MDI as used in Example 17 above, and was an attempt to duplicate these results. In Table 2, Example 18 employs 200 grams of PMDI, 16 g of oleyl alcohol, 900 ppm of catalyst and no epoxide. The same alcohol, catalyst and temperature were used in Example 18 above as in Example 17 above (and thus, Example 3 of U.S. Pat. No. 5,902,840). However, the conversion to allophanate % NCO in Example 18 is much lower one would expect from Example 17 (and Example 3 of U.S. Pat. No. 5,902,840). Very little difference exists in % NCO between theoretical urethane %NCO (27.8%) and the actual final allophanate-modified polymeric MDI %NCO (27.3%) in Example 18. This indicates that the conversion of urethane to allophanate under the conditions of U.S. Pat. No. 5,902,840 is low. Example 19 in Table 2 results in a 100% conversion of urethane to allophanate in less than 30 minutes, as opposed to 38% conversion of urethane to allophanate in Example 18 after 6 hours.

TABLE 3

Viscosity Stability

| | Example | | | | | | |
|---|---|---|---|---|---|---|---|
| | 18 | 19 | 20 | 21 | 22 | 23 | 24 |
| Isocyanate C (g) | 200 | 200 | 200 | 200 | 200 | 200 | 200 |
| Epoxide A (g) | — | 1.2 | 1.2 | 1.2 | 1.2 | 1.2 | 1.2 |
| Alcohol A (g) | 16 | 16 | 16 | — | — | — | — |
| Alcohol B (g) | — | — | — | — | 4 | 4 | — |
| Catalyst A (ppm) | 900 | 900 | 200 | 200 | 200 | — | — |
| Temperature (° C.) | 120 | 120 | 90 | 90 | 90 | 90 | 90 |
| Viscosity* @ time = 0 | 825 | 2050 | 1800 | 400 | 2195 | 413 | 275 |
| Viscosity* @ time = 14 days | 875 | 2250 | 2250 | 710 | 2195 | 413 | 275 |
| Viscosity* @ time = 21 days | 800 | 2150 | 2150 | 1100 | 2522 | 482 | 292 |
| Viscosity* @ time = 112 days | 900 | 2450 | 2150 | 140000 | 2900 | 925 | 525 |
| % total increase (21 days) | −3 | 5 | 17 | 175 | 15 | 17 | 6 |
| % total increase (112 days) | 9 | 20 | 19 | 34900 | 32 | 124 | 91 |

*viscosity units are mPa · s

Examples 18, 21, 23 and 24 are not representative of the present invention. Examples 19, 20 and 22 represent allophanate-modified PMDI produced according to the process of the present invention. A stable allophanate modified isocyanate was only obtained from a combination of allophanate conditions with epoxides. The magnitude of this stability effect is unexpected in view of the prior art. The allophanate modified products in Examples 22 and 23 were produced according to the process used in Examples 1, 2, and 5–16, while the allophanate-modified products in Examples 19 and 20 were produced according to the process used in Examples 3 and 4.

Table 3 illustrates the results of the viscosity study for Examples 18–24. The rows marked as "Viscosity @ time= 0", "Viscosity @ time=14 days", etc. represent the viscosity in mPa.s taken at the time of the reaction, 14 days later, etc. The samples were prepared and stored at room temperature for 14 days. The samples were stored at 42° C. for an additional 7 days and then the viscosity was taken and recorded as row "Viscosity @ time=21 days." The samples were then stored at room temperature for 91 days for a total of 112 days.

Examples 19 and 20 demonstrate the unexpected results of the process according to the invention, resulting in storage stable allophanate-modified polymeric MDI. These examples show that storage stable allophanate-modified polymeric MDI can be produced at temperatures between 90–120° C. Example 24 shows that adding an epoxide without a catalyst or alcohol does not give a stable product after 112 days (91% increase in viscosity of 112 days). Example 21 shows that an epoxide alone under allophanate process conditions (with the catalyst but without the alcohol) does not give a stable product. This example has a 34900% increase in viscosity after 112 days.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a storage stable allophanate-modified polymethylene poly(phenyl isocyanate) comprising:
   (A) reacting:
      (1) an intermediate comprising the reaction product of:
         (a) polymethylene poly(phenyl isocyanate) having an NCO group content of 20 to 33%, and having a monomer content of 26 to 95% by weight, and comprising:
            (i) from 0 to 5% by weight of the 2,2'-isomer of MDI;
            (ii) from 1 to 25% by weight of the 2,4'-isomer of MDI; and
            (iii) from 25 to 65% by weight of the 4,4'-isomer of MDI; and
            (iv) from 5 to 74% by weight of higher molecular weight homologues of the MDI series;
            with the %'s by weight of (1)(a)(i)–(1)(a)(iv) totaling 100% by weight of component (1)(a);
         (b) at least one epoxide; and
         (c) at least one alcohol;
            wherein said reaction was carried out at a temperature of from about 25 to about 90° C. and for a time of about 5 minutes to about 1 hour; with
      (2) at least one allophanate catalyst;
         at a temperature of from about 60 to about 120° C. for about 15 minutes to about 4 hours.

2. A process according to claim 1, wherein (A)(1)(b) at least one epoxide and (A)(1)(c) at least one alcohol are added simultaneously to (A)(1)(a) the polymethylene poly (phenyl isocyanate) to form the intermediate (A)(1).

3. A process according to claim 1, wherein (A)(1)(b) at least one epoxide is added first to (A)(1)(a) the polymethylene poly(phenyl isocyanate) before (A)(1)(c) at least one alcohol is added to form the intermediate (A)(1).

4. A process according to claim 1, wherein (A)(1)(c) at least one alcohol is added first to (A)(1)(a) the polymethylene poly(phenyl isocyanate) before (A)(1)(b) at least one epoxide is added to form the intermediate (A)(1).

5. A process according to claim 1, wherein (b) said epoxide is selected from the group consisting of epoxidized linseed oil, butyl glycidyl ether, epichlorohydrin, 1,2-epoxyoctane, 1,2-epoxy-3-phenoxypropane, glycidol and mixtures thereof.

6. A process according to claim 1, wherein (c) said alcohol is selected from the group consisting of oleyl alcohol, isobutanol and mixtures thereof.

7. A process for the preparation of a storage stable allophanate-modified polymethylene poly(phenyl isocyanate) comprising:
   (A) reacting:
      (1) an intermediate comprising the reaction product of:
         (a) polymethylene poly(phenyl isocyanate) having an NCO group content of 20 to 33%, and having a monomer content of 26 to 95% by weight, comprising:
            (i) from 0 to 5% by weight of the 2,2'-isomer of MDI;
            (ii) from 1 to 25% by weight of the 2,4'-isomer of MDI;

(iii) from 25 to 65% by weight of the 4,4'isomer of MDI; and
(iv) from 5 to 74% by weight of higher molecular weight homologues of the MDI series;
with the %'s by weight of (1)(a)(i)–(1)(a)(iv) totaling 100% by weight of component (1)(a); and
(b) at least one epoxide;
wherein the reaction was carried out at a temperature of from about 25 to about 90° C. and for a time of about 5 minutes to about 1 hour; with
(2) at least one allophanate catalyst; and
(3) at least one alcohol;
at a temperature of from about 60 to about 120° C. for about 15 minutes to about 4 hours.

8. A process according to claim 7, wherein (A)(2) at least one allophanate catalyst and (A)(3) at least one alcohol are added simultaneously to (A)(1) the intermediate.

9. A process according to claim 7, wherein (A)(2) at least one allophanate catalyst is added first to (A)(1) the intermediate before (A)(3) at least one alcohol is added.

10. A process according to claim 7, wherein (A)(3) at least one alcohol is added first to (A)(1) the intermediate before (A)(2) at least one allophanate catalyst is added.

11. A process according to claim 7, wherein (b) said epoxide is selected from the group consisting of epoxidized linseed oil, butyl glycidyl ether, epichlorohydrin, 1,2-epoxyoctane, 1,2-epoxy-3-phenoxypropane, glycidol and mixtures thereof.

12. A process according to claim 7, wherein (3) said alcohol is selected from the group consisting of oleyl alcohol, isobutanol and mixtures thereof.

13. An allophanate-modified polymethylene poly(phenyl isocyanate) comprising the reaction product of:
(1) an intermediate which comprises the reaction product of:
(a) polymethylene poly(phenyl isocyanate) having an NCO group content of 20 to 33%, and having a monomer content of 26 to 95% by weight, and comprising:
(i) from 0 to 5% by weight of the 2,2'-isomer of MDI;
(ii) from 1 to 25% by weight of the 2,4'-isomer of MDI;
(iii) from 25 to 65% by weight of the 4,4'-isomer of MDI; and
(iv) from 5 to 74% by weight of higher molecular weight homologues of the MDI series;
with the %'s by weight of (1)(a)(i)–(1)(a)(iv) totaling 100% by weight of component (1)(a);
(b) at least one epoxide; and
(c) at least one alcohol;
wherein said reaction was carried out at a temperature of from about 25 to about 90° C. and for a time of about 5 minutes to about 1 hour; with
(2) at least one allophanate catalyst;
at a temperature of from about 60 to about 120° C. for about 15 minutes to about 4 hours.

14. The allophanate-modified polymethylene poly(phenyl isocyanate) of claim 13, wherein (1)(b) at least one epoxide and (1)(c) at least one alcohol are added simultaneously to (1)(a) the polymethylene poly(phenyl isocyanate) to form the intermediate (1).

15. The allophanate-modified polymethylene poly(phenyl isocyanate) of claim 13, wherein (1)(b) at least one epoxide is added first to (1)(a) the polymethylene poly(phenyl isocyanate) before (1)(c) at least one alcohol is added to form the intermediate (1).

16. The allophanate-modified polymethylene poly(phenyl isocyanate) of claim 13, wherein (1)(c) at least one alcohol is added first to (1)(a) the polymethylene poly(phenyl isocyanate) before (1)(b) at least one epoxide is added to form the intermediate (1).

17. The allophanate-modified polymethylene poly(phenyl isocyanate) of claim 13, wherein (b) said epoxide is selected from the group consisting of epoxidized linseed oil, butyl glycidyl ether, epichlorohydrin, 1,2-epoxyoctane, 1,2-epoxy-3-phenoxypropane, glycidol and mixtures thereof.

18. The allophanate-modified polymethylene poly(phenyl isocyanate) of claim 13, wherein (c) said alcohol is selected from the group consisting of oleyl alcohol, isobutanol and mixtures thereof.

19. An allophanate-modified polymethylene poly(phenyl isocyanate) comprising the reaction product of:
(1) an intermediate comprising the reaction product of:
(a) polymethylene poly(phenyl isocyanate) having an NCO group content of 20 to 33%, and having a monomer content of 26 to 95% by weight, comprising:
(i) from 0 to 5% by weight of the 2,2'-isomer of MDI;
(ii) from 1 to 25% by weight of the 2,4'-isomer of MDI;
(iii) from 25 to 65% by weight of the 4,4'isomer of MDI; and
(iv) from 5 to 74% by weight of higher molecular weight homologues of the MDI series;
with the %'s by weight of (1)(a)(i)–(1)(a)(iv) totaling 100% by weight of component (1)(a); and
(b) at least one epoxide;
wherein the reaction was carried out at a temperature of from about 25 to about 90° C. and for a time of about 5 minutes to about 1 hour; with
(2) at least one allophanate catalyst; and
(3) at least one alcohol;
at a temperature of from about 60 to about 120° C. for about 15 minutes to about 4 hours.

20. The allophanate-modified polymethylene poly(phenyl isocyanate) of claim 19, wherein (2) at least one allophanate catalyst and (3) at least one alcohol are added simultaneously to (1) the intermediate.

21. The allophanate-modified polymethylene poly(phenyl isocyanate) of claim 19, wherein (2) at least one allophanate catalyst is added first to (1) the intermediate before (3) at least one alcohol is added.

22. The allophanate-modified polymethylene poly(phenyl isocyanate) of claim 19, wherein (3) at least one alcohol is added first to (1) the intermediate before (2) at least one allophanate catalyst is added.

23. The allophanate-modified polymethylene poly(phenyl isocyanate) of claim 19, wherein (b) said epoxide is selected from the group consisting of epoxidized linseed oil, butyl glycidyl ether, epichlorohydrin, 1,2-epoxyoctane, 1,2-epoxy-3-phenoxypropane, glycidol and mixtures thereof.

24. The allophanate-modified polymethylene poly(phenyl isocyanate) of claim 19, wherein (3) said alcohol is selected from the group consisting of oleyl alcohol, isobutanol and mixtures thereof.

* * * * *